(12) United States Patent
Wursching et al.

(10) Patent No.: US 8,330,370 B2
(45) Date of Patent: Dec. 11, 2012

(54) COMPACT FLUORESCENT LAMP WITH IMPROVED THERMAL MANAGEMENT

(75) Inventors: Istvan Wursching, Budapest (HU); Jozsef Fulop, Budapest (HU); Ferenc Papp, Budapest (HU); Laszlo Bankuti, Budapest (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/839,457

(22) Filed: Jul. 20, 2010

(65) Prior Publication Data

US 2012/0019136 A1  Jan. 26, 2012

(51) Int. Cl.
*H01J 17/16* (2012.01)

(52) U.S. Cl. .................................. 313/634; 313/318.12

(58) Field of Classification Search .................... 313/51, 313/317, 318.01–318.12, 573, 624, 625, 313/634

See application file for complete search history.

(56) References Cited

U.S. PATENT DOCUMENTS

| | | | | |
|---|---|---|---|---|
| 5,552,666 A * | 9/1996 | Shea et al. | ...................... | 313/493 |
| 6,064,155 A * | 5/2000 | Maya et al. | ...................... | 315/56 |
| 6,404,123 B1 * | 6/2002 | Cooch | ............................ | 313/493 |
| 7,888,871 B2 * | 2/2011 | Luczenbacher | ............... | 313/610 |
| 2007/0063656 A1 * | 3/2007 | Wursching et al. | ........... | 313/634 |
| 2008/0278057 A1 * | 11/2008 | Tokes et al. | .................... | 313/493 |
| 2008/0284336 A1 * | 11/2008 | Luczenbacher | ............... | 313/610 |

* cited by examiner

*Primary Examiner* — Bumsuk Won
(74) *Attorney, Agent, or Firm* — Fay Sharpe LLP

(57) ABSTRACT

A compact fluorescent lamp includes an inverted compact fluorescent light source housed within an outer envelope. Locating the first and second ends of the coiled CFL source positions the electrodes within a substantially spherical outer envelope at a location remotely spaced from the ballast compartment. In this manner, only small diameter first and second lead wires that mechanically and electrically engage the electrodes pass through small dimensioned passages in a separation member in the outer envelope cavity. This substantially reduces the thermal stress on the components.

12 Claims, 1 Drawing Sheet

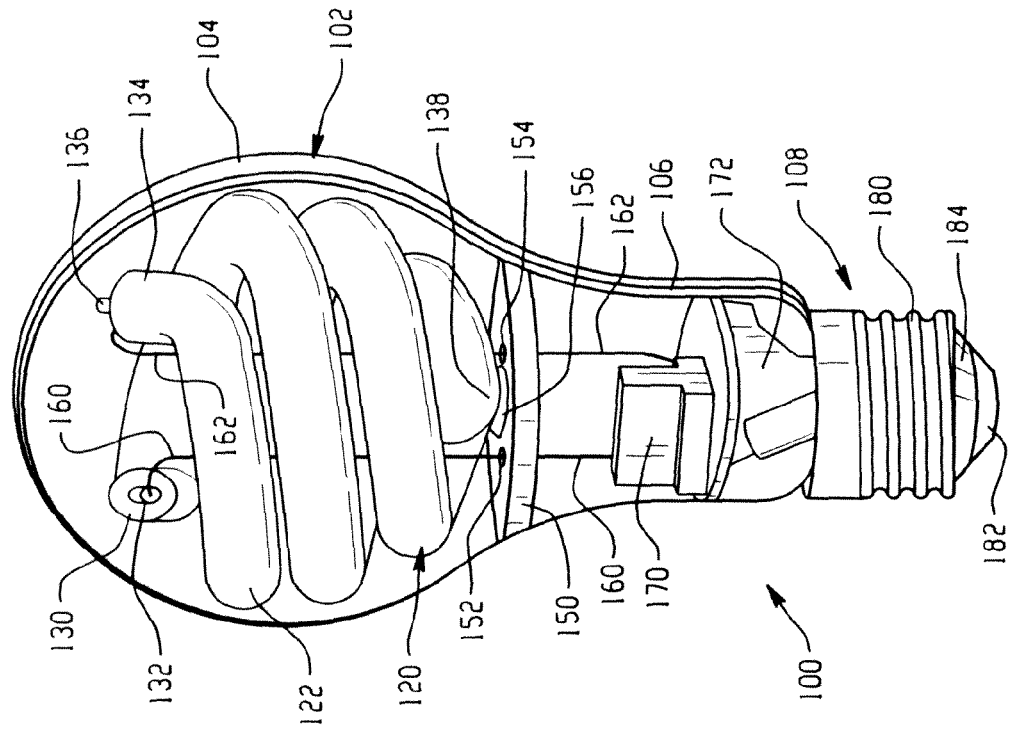
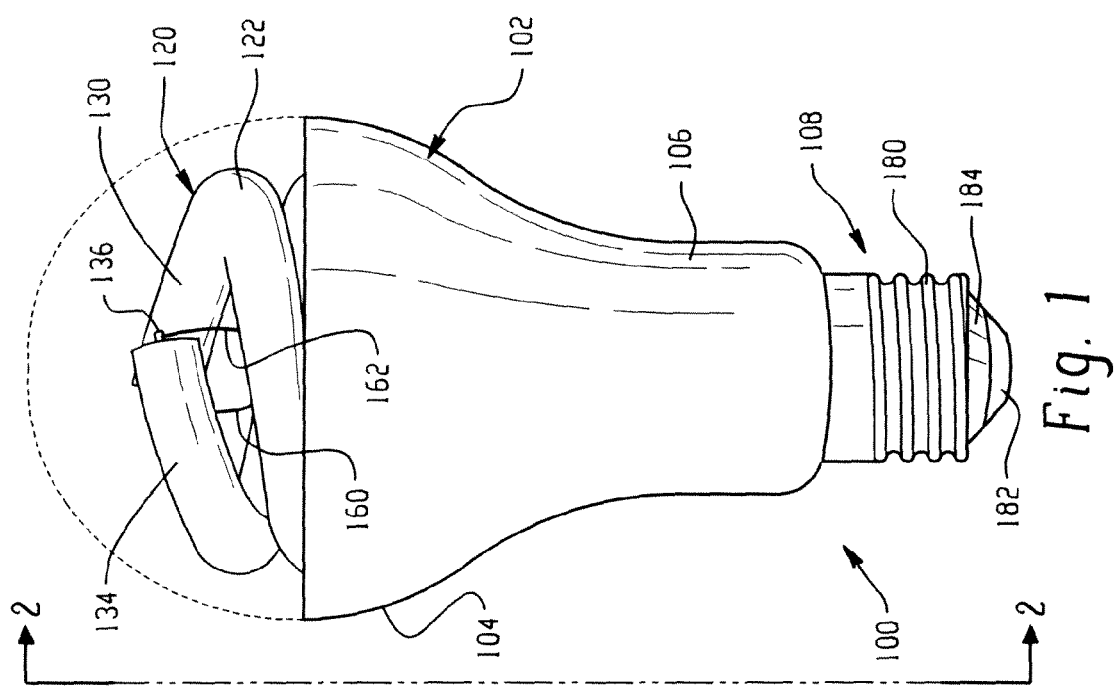

COMPACT FLUORESCENT LAMP WITH IMPROVED THERMAL MANAGEMENT

BACKGROUND OF THE DISCLOSURE

This disclosure relates to lighting or lamp assemblies and more particularly to a compact fluorescent lamp (CFL) or lamp assembly. It finds particular application when used in an A-line lamp profile, and particularly one where the discharge tube of the compact fluorescent light source has a spiral or double helix conformation. Selected aspects, however, may find application with other compact fluorescent light sources or lamp assemblies.

In current compact fluorescent lamp arrangements, electrodes provided in the lamp ends of an elongated discharge path protrude into a ballast compartment. This structural arrangement locates the electrodes adjacent the ballast so that lead wires extend only a short distance between the ballast and the electrodes. In compact fluorescent lamps of this type, the compact fluorescent light source is oftentimes a spiral, coiled, or helical discharge tube arrangement. An enclosing light transmissive, glass envelope or outer bulb has a generally spherical portion dimensioned to receive the CFL discharge tube therein. The outer envelope typically includes an elongated necked portion or generally cylindrical portion extending between the generally spherical portion and a lamp base. The ballast is located in the necked down region, for example, and is oftentimes a printed circuit board (PCB) that receives additional electronic components that are mechanically and electrically connected on the PCB for connection with the electrodes of the discharge tube of the CFL. An additional set of lead wires extend from the ballast/PCB and make contact with electrical contacts in the base of the lamp. For example, one type of common arrangement for the base is what is commonly referred to as an Edison base that includes a threaded, electrically conductive shell that defines a first contact and that is separated from a ring or second contact located at a terminal end of the base. The ring contact and the threaded shell are typically separated by an insulating material in a manner well known in the art.

Prior lamp arrangements of this type sometimes employ a dividing wall that has first and second openings to receive the first and second discharge tube ends and likewise the electrodes of the discharge tube. The dividing wall is usually located at the juncture between the substantially spherical portion of the outer envelope and that region where the glass envelope merges into the necked down region. The dividing wall provides some additional thermal protection to a ballast compartment defined below the dividing wall from the remainder of the coiled discharge tube received in the generally spherical portion of the envelope. In this manner, an A-line lamp configuration is provided that employs an efficient low energy lamp such as a compact fluorescent light source.

Even with these proposed solutions, known CFL arrangements impose substantial thermal stress on the electronic components of the ballast arrangement. This thermal stress results in a shorter lamp life or requires use of more expensive electrical components that are able to withstand the thermal impacts. Consequently, a need exists for reducing the thermal stress of the electrical components of a ballast circuit or PCB.

SUMMARY OF THE DISCLOSURE

A new compact fluorescent lamp is provided that addresses thermal stress issues associated with electronic components.

An exemplary embodiment of the compact fluorescent lamp includes an envelope having an inner cavity with a wall dividing the envelope cavity into first and second portions. The compact fluorescent light (CFL) source has an elongated discharge tube with first and second ends each having an electrode contained in the first portion of the envelope cavity. A ballast is received in the second portion of the envelope cavity.

The first and second ends of the discharge tube are preferably disposed at a location remote from the dividing wall.

The CFL source preferably has a generally spiral or double helix conformation.

Preferably the ballast is received in a necked down, generally cylindrical portion of the lamp disposed adjacent the base and interposed between the base and a substantially spherical portion.

A primary benefit is the reduced thermal stress on the electrical components.

Still another benefit is the ability to use less expensive electrical components and still achieve comparable results.

Still another benefit is associated with extended end of life prospects by reducing the thermal stress.

Still benefits and advantages of the present disclosure will become more apparent upon reading and understanding the following detailed description.

BRIEF DESCRIPTION OF THE DRAWINGS

FIG. 1 is an elevational view of a compact fluorescent lamp with a portion of the outer envelope removed for ease of illustration and insertion of the CFL light source.

FIG. 2 is an elevational view of the compact fluorescent lamp of FIG. 1 with the outer envelope shown in cross-section for ease of illustration of the internal components.

DETAILED DESCRIPTION OF THE PREFERRED EMBODIMENTS

Turning to FIGS. 1 and 2, a lamp such as a compact fluorescent lamp 100 is shown and includes an outer envelope 102, formed of a light transmissive material such as glass, that has a generally A-line configuration. That is, the outer envelope has a first, substantially spherical upper portion 104 that transitions into a necked down, generally cylindrical region 106 which is closed at its lower end with a base 108. Received within the outer envelope 102 is a light source, which in this particular instance is a high efficiency compact fluorescent light source 120. Preferably, the compact fluorescent light (CFL) source includes a discharge tube 122 having a spiral, coiled, or more preferably a double helical configuration. As clearly shown in the Figures, the discharge tube varies in its diameter so as to maximize the amount of the cavity that is used by the discharge tube within the outer envelope. The double helical conformation includes a first lamp end 130 having an associated first electrode 132 that extends outwardly therefrom. A second end 134 similarly includes an electrode, namely second electrode 136.

As is evident in the Figures, apex 138 of the double helix conformation is located at an opposite end of the CFL source 120. It is also evident that the CFL source 120 is inverted in the outer envelope when compared to prior art arrangements. That is, the first and second ends 130, 134 of the coiled discharge tube are located at the dome or upper end of the substantially spherical portion 104 of the outer envelope, while the apex 138 is located closer to the necked down region/substantially cylindrical portion 106.

Further, and as evident in FIG. 2, a separation member or dividing wall 150 extends across and separates the outer envelope cavity into an upper, substantially spherical portion or first end 104 of the spherical cavity and a second or lower generally cylindrical portion or second end 106 of the spherical cavity. The separation member 150 is dimensioned for abutting engagement with the inner surface of the outer envelope and includes first and second passages 152, 154 that are relatively small dimensioned passages that communicate between the upper and lower cavity portions of the outer envelope separated by the separation member and as will be described further below. Preferably, the separation member 150 is formed of a thermally resistant or thermally insulating material so that high temperatures associated with operation of the CFL source can be substantially confined to the upper cavity portion. As is also evident in FIG. 2, the apex 138 may be mechanically secured to the separation member, for example, through use of an adhesive 156. This adhesive positions and stabilizes a position of the CFL source within the substantially spherical portion of the envelope. In addition, lead wires 160, 162 are mechanically and electrically connected to the first and second electrodes 132, 136, respectively.

As shown in FIGS. 1 and 2, the lead wires 160, 162 extend from the connection with the first and second electrodes 132, 136, respectively, and through the inner cavity defined within the space formed by the coiled discharge tube where the lead wires then proceed through respective first and second passages 152, 154 of the separation member 150. In this manner, and as will be appreciated from FIG. 2, the passages 152, 154 are of a substantially reduced dimension to limit thermal communication therethrough. The lead wires proceed into the cavity portion of the envelope defined by the substantially cylindrical portion 106 of the outer envelope. This is sometimes referred to as the ballast compartment where the electronic ballast 170 is mounted. For example, printed circuit board 172 and other components of the electronic ballast are located within the ballast compartment. The lead wires 160, 162 are connected with the ballast or printed circuit board. In addition, lead wires (not shown) extend from the ballast assembly for connection with the base 108, and particularly the threaded shell 180 and ring contact 182 at the terminal end of the base. An insulating material 184 is disposed between the threaded shell 180 and the ring contact to segregate the components and prevent inadvertent shorting when the lamp is received into an associated fixture (not shown).

By removing the electrode containing lamp ends 130, 134 from the ballast compartment of the lamp, a lower ambient temperature for the electronic components of the ballast circuit is achieved. The temperature in the ballast compartment is significantly reduced which results in longer life when compared with the solution used in association with typical CFL lamps that house the electrical components in the outer envelope. Alternatively, less expensive components that are not as resistant to thermal stress can be substituted for those electrical components that are typically used in order to withstand the elevated temperatures associated with the enclosed ballast compartment while still maintaining comparable performance characteristics with known lamps.

The temperature in the space around the electronic ballast is reduced, for example, more than approximately 10° C. This arrangement also reduces the potential for flammable plastic component materials that are typically found in the electrodes and for which an end of life solution is typically required for the lamp. As a result, the chances for overheating, smoking, charred plastic components, etc. are all reduced. Thermal isolation is improved between the lamp and the ballast compartment and the thermal stress on the electronic components is significantly reduced.

In a preferred embodiment, the openings through the separation member have a diameter on the order of approximately 0.4 to 0.8 mm which is a substantial reduction when compared to dimensions of the openings that receive the discharge tube ends in prior art arrangements, e.g., on the order of about 8-10 mm.

In conclusion, a compact fluorescent lamp includes a discharge tube arrangement with at least one discharge tube. The tube is preferably formed of glass, encloses a discharge volume filled with a discharge gas, and has a fluorescent phosphor coating disposed on the inner surface of the tube. The tube forms a continuous arc path and the tube is provided with electrodes disposed at each end of the arc path. The lamp also includes a ballast circuit connected to the electrodes by lead-in wires and to a supply voltage by lead-out wires for controlling the current in the tube. A bulb shaped outer envelope has a substantially spherical portion having a dome that encloses the tube arrangement and an elongated end portion that encloses the ballast circuit. The discharge tube is located in the outer bulb such that that the tube ends provided with electrodes are in the vicinity of the dome of the spherical portion of the outer bulb. The lamp is provided with a base to be fitted into an associated lamp socket.

According to the proposed arrangement, the electrode containing lamp ends are removed from the ballast compartment. This results in a lower ambient temperature for the electronic components of ballast circuit. With this solution, the temperature in the ballast compartment is reduced significantly allowing either (i) use of less expensive components or (ii) gaining longer life with use of current components.

The disclosure has been described with reference to a preferred embodiment. It will be appreciated that minor alterations may be made without departing from the scope and intent of the present disclosure.

What is claimed is:

1. A compact fluorescent lamp comprising:
an envelope having a generally spherical portion and a generally cylindrical portion closed by a base;
a ballast received in the generally cylindrical portion of the envelope cavity; and
a separation member extending between the generally spherical position and the generally cylindrical portion of the envelope and dividing the envelope into first and second portions whereby an ambient temperature of the ballast is reduced; and
a compact fluorescent light (CFL) source dimensioned for receipt in the envelope, the CFL source having first and second ends each having an electrode contained therein at one end of the spherical portion, and an apex at an other end of the generally spherical portion adjacent the separation member.

2. The compact fluorescent lamp of claim 1 wherein the first and second ends of the CFL source are spaced from the separation member.

3. The compact fluorescent lamp of claim 1 wherein the CFL source has a generally spiral configuration.

4. The compact fluorescent lamp of claim 3 wherein the spiral CFL source has a generally double helical conformation.

5. The compact fluorescent lamp of claim 1 further comprising first and second electrical contacts located adjacent a terminal end of the generally spherical portion of the envelope.

6. The compact fluorescent lamp of claim 1 wherein the first electrical contact is a threaded shell.

7. The compact fluorescent lamp of claim 1 wherein the first and second ends of the CFL source are located at a dome portion of the generally spherical first portion.

8. The compact fluorescent lamp of claim 1 wherein the CFL source has a substantially double helical conformation with the first and second ends of the CFL source located further from the second portion than an apex of the CFL source.

9. The compact fluorescent lamp of claim 8 wherein the apex of the CFL source is adhesively secured to the separation member.

10. The compact fluorescent lamp of claim 1 wherein the CFL source has a helical conformation, and first and second leads are connected to the respective electrodes, and the first and second leads extend through a central region of the helical CFL source before passing through the separation member for connection with the ballast.

11. The compact fluorescent lamp of claim 1 wherein the base is a threaded Edison-style base.

12. The compact fluorescent lamp of claim 1 further comprising first and second leads extending from the ballast and through the separation member for connection with the first and second electrodes, respectively, of the CFL source.

* * * * *